Patented Dec. 5, 1922.

1,437,893

UNITED STATES PATENT OFFICE.

MAX W. HENDRICH, OF SAN FRANCISCO, CALIFORNIA.

WATERPROOFING COMPOSITION.

No Drawing.     Application filed May 2, 1922. Serial No. 557,999.

*To all whom it may concern:*

Be it known that I, MAX W. HENDRICH, a citizen of the United States, residing at San Francisco, in the county of San Francisco, State of California, have invented a new and useful Waterproofing Composition, of which the following is a specification in such full and clear terms as will enable those skilled in the art to construct and use the same.

This invention consists of a solution for waterproofing brick walls, concrete walls or other structures, and an object of the invention is to produce a solution which will carry the materials necessary to effect the waterproofing without causing them to precipitate or deposit from the solution prior to the time when the solution has dried upon the walls.

The solution used consists of a calcium acetate and aluminum sulphate solution. This solution will precipitate when brought into contact with a neutral soap solution and form an insoluble compound which is repellent to water. Such solutions are ordinarily impossible to use as a single solution because of the fact that the precipitation takes place immediately thereby destroying the real value of the solution.

This particular invention consists in so combining the calcium acetate and aluminum sulphate with a soap solution that no precipitation will take place until the material saturated with the solution dries. For this purpose I use an albumen as a retarding agent which prevents the precipitation of the calcium acetate and aluminum sulphate until the solution dries, whereupon the precipitation will occur.

In the present instance glue is made into a thin solution which in a heated state is mixed with the heated soap solution. The proportions of the retarding agent may be varied at will, but I have found that a very small part of said agent will be effective to prevent the precipitation prior to spreading the solution upon the surface to be treated.

The solution used to accomplish this object consists of water 100 pounds, calcium acetate 16 pounds. This solution is then combined with water 100 pounds, aluminum sulphate 8 pounds, and to the two solutions combined is added water 300 pounds, soap 6 pounds and glue, 1 pound.

While it has been mentioned that this solution is of advantage in waterproofing brick walls and concrete walls, as a matter of fact it can be used for waterproofing a great many other porous materials such as fabrics, paper, leather and many substances that are ordinarily water absorbent.

A heated soap solution containing the glue has the calcium acetate and aluminum sulphate added thereto, whereupon the solution is thoroughly mixed and is then ready for use and the glue will prevent the precipitation indefinitely.

What I claim is as follows, but modifications may be made in the above particularly described form of the invention within the purview thereof.

1. A waterproofing composition consisting of a calcium acetate, aluminum sulphate solution with a neutral soap solution, and an agent in sufficient quantity to retard the precipitation of the solution.

2. A waterproofing solution consisting of a solution of calcium acetate and aluminum sulphate in a neutral soap solution, and an albumen in sufficient quantity in the solution to retard the precipitation thereof.

3. A waterproofing solution consisting of calcium acetate and aluminum sulphate with a neutral soap solution, and glue in sufficient quantity to retard the precipitation of the solution.

4. A solution for waterproofing comprising a neutral soap solution, a compound adapted to precipitate when brought into contact with such soap solution and an agent in the solution to prevent the precipitation prior to the drying of the solution.

5. A waterproofing composition comprising approximately 500 pounds of water, calcium acetate approximately 3%, aluminum sulphate approximately 2%, soap approximately 6% and glue about two-tenths of 1%.

In testimony whereof I have hereunto set my hand this 25" day of April A. D. 1922.

MAX W. HENDRICH.